July 11, 1961 — J. LE ROY SWANSON — 2,991,836
LAND PACKER
Filed March 16, 1959

INVENTOR
JOHN L. SWANSON
BY
ATTORNEY

United States Patent Office 2,991,836
Patented July 11, 1961

2,991,836
LAND PACKER
John Le Roy Swanson, 1714 Morgan Ave.,
Saskatoon, Saskatchewan, Canada
Filed Mar. 16, 1959, Ser. No. 799,540
7 Claims. (Cl. 172—545)

This invention relates to agriculture implements, and more particularly to a land packer.

It is widely recognized that seed germination can be promoted and soil erosion minimized by packing loose soil. In some types of soil where the climate is dry and the tilled soil is loose, planted seeds may be noticeably delayed in germination or may not germinate at all. Packers are, therefore, utilized to tamp and firm the soil about each individual seed and thereby bring moisture into intimate contact with the seed. Portions of the earth underneath and to the side of the seed may remain loose and, hence, permit the easy formation and penetration of a root structure as it develops. Proper packing of soil, therefore, involves consistent spaced contact of a packing implement with the surface, which contact is neither too light nor too heavy.

In addition to aiding germination and root formation, the packing of land also helps to prevent erosion by wind or water. Where the wind tends to pick up loose top soil, the packed portions remain as ridges which interrupt the drifting and travel of the soil. Water from heavy rainfall will merely collect in the depressions formed by packing and will be retained and permitted to soak into the ground rather than to cumulatively run off into low areas and thereby wash away valuable top soil.

It is an important object of the present invention to provide an inexpensive and efficient land packer which is capable of uniform packing even on hilly or bumpy soil.

Another object of the invention is to utilize cast metal packer wheels, each of which is capable of rolling in a straight line without conventional hub and shaft connections.

A further object of the invention is to provide a packer implement having a plurality of individual weighted wheels, each of which rolls in a predetermined position with respect to the other wheels and travels independently over rises and depressions in the surface of the ground while exerting a substantially constant force continuously along its line of travel.

A still further object is to provide a special flexible mount for individual packer wheels which will maintain the packer wheels in firm upright and horizontally spaced relation and yet will permit free vertical movement and restricted lateral shifting of the individual wheels.

These and other objects and advantages of my invention will more fully appear from the following description, made in connection with the accompanying drawings wherein like reference characters refer to the same parts throughout the several views and in which.

Figure 1:
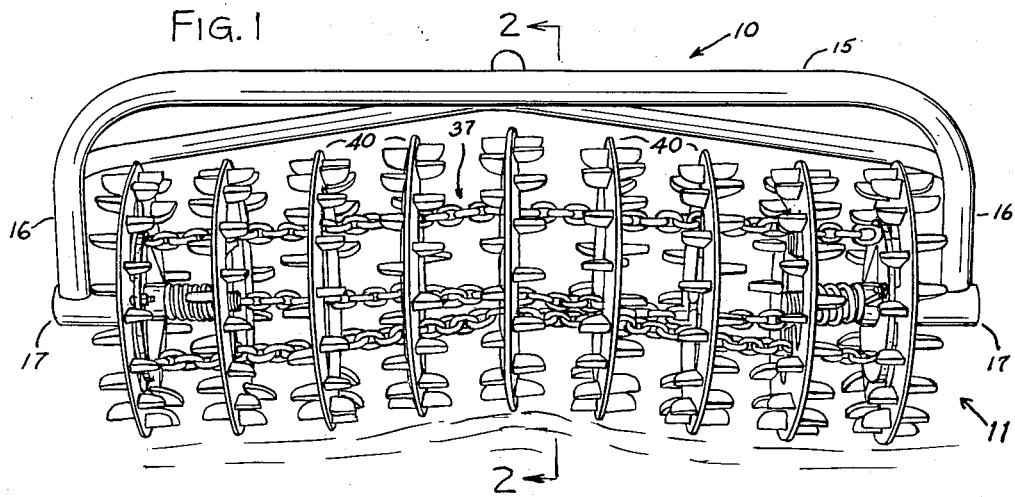
FIGURE 1 is a rear view of the land packer showing a characteristic flexing of the packing wheels as they travel over bumpy ground.

With continued reference to the drawing, the land packer comprises generally a frame 10 and a rotary packing assemblage 11. The frame 10 is adapted to be drawn by a vehicle such as a tractor (not shown) and the rotary packing assemblage 11 is caused to rotate by being drawn over the ground and to exert a packing influence on the ground which is traversed.

Figure 2:
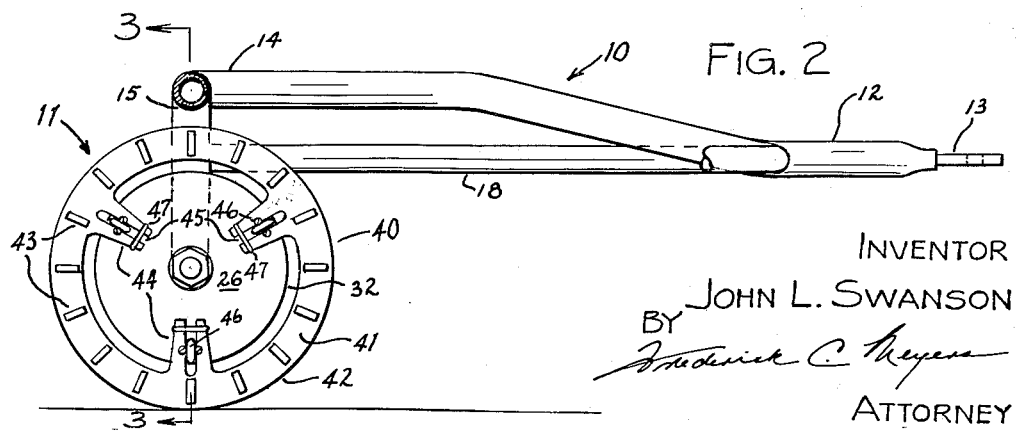
FIGURE 2 is a vertical section taken on the line 2—2 of FIGURE 1.

The frame 10 is of rigid construction and comprises a drawbar 12 terminating forwardly in a connector 13 adapted to be secured to a clevis or the like extending rearwardly from a tractor or other vehicle. The drawbar 12 extends upwardly and rearwardly to terminate at 14 in a rigid connection with the U-frame 15 which, in turn, has downwardly extending ends 16 terminating in horizontally spaced and axially aligned bearing members 17. For additional rigidity, the lateral braces 18 are secured as by welding to the downward extensions 16 and are similarly secured forwardly to the drawbar 12, as shown in FIGS. 1 and 2. It will be noted that frame 10 is so arranged as to define a clear space below, between, and for some distance above, the bearings 17. Frame 10 may be conveniently fabricated from tubular stock which may give the desired strength with economy.

Figure 3:
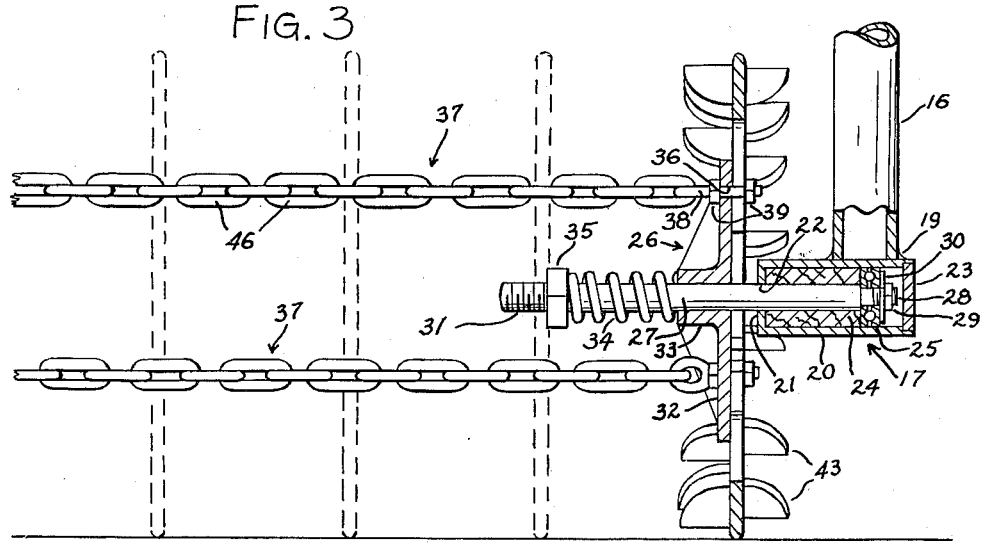
FIGURE 3 is an enlarged vertical section in fragment taken on the line 3—3 of FIGURE 2, the wheels being rotated slightly to show a pair of the flexible chain elements. To avoid unnecessary duplication, portions of the drawing are omitted as indicated by the dotted lines.

The bearing itself is shown in detail in FIG. 3. The downwardly extending portion 16 of the U-shaped portion 15 is secured as by welding at 19 to the cylindrical bearing shell 20 of bearing 17 and the shell 20 for each of the bearings 17 has a confronting end portion 21 with an axial opening 22 arranged to lie on a mutual axis. The other end of casing 20 has a removable closure 23 permitting lubrication and keeping out extraneous material during operation of the device. Within the casing 20 is a wooden bearing 24 which abuts against the inner end 21 of each of the bearings 17 and which cooperates with an outer thrust bearing 25, as shown in FIG. 3. The wooden sleeve bearing 24 is designed to absorb lateral stress while thrust bearing 25 accommodates inward axial thrust. I find the wooden bearing 24 useful in preventing dust and grit from reaching the thrust bearing 25, and it also provides a cheap and efficient bearing structure for the relatively slow rotational requirements of the packer.

The rotary packing assemblage 11 is journaled across the aforementioned bearings 17 and, to this end, is provided with a pair of confronting rotors 26 journaled in the respective bearings 17. Rotors 26 each have an axial shaft 27 which extends into the wooden bearing 24 and terminates in a reduced threaded end 28, which is received within the thrust bearing 25, as shown. The threaded end 28 is provided with a fixedly adjustable nut 29 which, in turn, bears against a plate or washer 30 in contact with the thrust bearing 25. The shafts 27 terminate inwardly in threaded ends 31 which, though widely spaced, lie in axial alignment.

On each of the shafts 27 is mounted a disc 32 which has a hub portion 33 slidably mounted on the shaft 27 and bearing against compression spring 34, which in turn is secured against endwise displacement by the nut 35 threadedly secured to the end 31 of shaft 27. Disc 32 is also provided with a plurality of openings 36 which are spaced circumferentially about the axis of shaft 27 in each of the confronting rotors 26.

A plurality of flexible members such as chain lengths 37 have fasteners such as eye-bolts 38 at each end, the eye-bolts 38 being fastened threadedly by nuts 39 to discs 32 in cooperation with the openings 36. The elongated flexible members 37 are equally tensioned so as to interconnect the confronting rotors 26 and lie in spaced parallel relation with the axis of shaft 27 as shown.

Also forming a part of the rotary packing assemblage is a plurality of weight wheels 40, each of which is provided with an annular disc portion 41 terminating outwardly in a smooth circumferential bearing surface 42. A plurality of spaced compacting feet 43 may be integrally cast with the wheel 40 so that each of the wheels will exert a compacting influence over a wider area of ground.

Also forming a part of each of the weight wheels 40 are a plurality of inwardly extending lugs 44 having radial slots 45 adapted each to receive a flexible member 37, as shown. Where the flexible member 37 constitutes a chain, the individual links 46 may be utilized to hold the wheel 40 against axial movement. Latching means such as the spring keys 47 may be snapped about the ends of the lugs 44 so as to close off slots 45 and prevent the flexible members 37 from disengaging themselves from the wheels 40 while they are traveling over uneven terrain.

In order to fully utilize the space defined beneath frame 10, I mount one of the cast weight wheels 40 directly on the disc 32, as shown in FIG. 3. Since the spaces 45 of each of the lugs 44 lies in alignment with holes 36 in disc 32, I may position a wheel 40 in direct contact with each of the discs 32 and pass each eye-bolt 38 through a registered slot 45 in the manner shown in FIG. 3.

When the entire rotary packing assemblage is properly mounted, each of the confronting rotors 26, together with its mounted wheel 40, will lie in spaced relation with the end 21 of bearing 17. Spring 34 will thus lie under constant tension and each of the flexible elements 37 will likewise remain under tension. Each of the weight wheels 40 will rotate as the apparatus is pulled along the ground, and, at the same time, it is maintained at a fixed distance from the neighboring wheels. Each wheel, however, is permitted to raise or lower independently of the other wheels and, hence, an even compacting force is exerted at all times by all of the wheels irrespective of the unevenness of the ground. Where the flexible members 37 are caused to yield during travel as shown in FIG. 1, the compression springs 34 will permit confronting rotors 26 to move convergently until the members 37 again straighten out, the rotors 26 then moving divergently to their original positions. Because of the repeated independent movement of the weight wheels 40 and the centerless character of the rotary packing assemblage, there is no tendency for moist soil to ball-up or foul the working mechanism.

Under various operating conditions, it may be desirable to shorten or lengthen the spacing between wheels 40. The chain linkage arrangement is particularly useful in this respect since each wheel may be merely moved to the appropriate corresponding links 46 to achieve the desired spacing.

It will, of course, be understood that various changes may be made in the form, details, arrangements and proportions of the parts without departing from the scope of my invention as set forth in the appended claims.

What I claim is:

1. A land packer comprising, a frame having a pair of horizontally spaced and axially aligned bearings, a rotary packing assemblage journaled in said bearings and having elongated flexible members tensioned thereacross in mutually parallel relation with the axis of the assemblage, and further having circular weight compacters mounted circumferentially about the flexible members and secured against axial shifting at horizontally spaced intervals therealong.

2. A land packer comprising, a frame having a pair of horizontally spaced and axially aligned bearings, a pair of confronting rotors journaled respectively in said bearings, a plurality of flexible members mounted across the respective rotors and in spaced parallel relation with the axis of said rotors, and a plurality of weight wheels mounted around and secured to said flexible members being adapted to rotate in horizontally spaced relation whereby each wheel will rotate on forward motion of the packer and will independently ride in intimate compacting relation with the soil.

3. A land packer comprising, a frame having a pair of horizontally spaced and axially aligned bearings, rotary mounting means journaled respectively in said bearings in confronting relation, a plurality of chains having their ends secured respectively to said mounting means and tensioned thereacross in mutually spaced parallel relation, and a plurality of weight wheels mounted around said chains and secured thereto in horizontally spaced relation whereby each wheel will rotate on forward motion of the packer and will independently ride in intimate compacting relation with the soil, said plurality of chains rotating with said weight wheels in a substantially fixed parallel relation about the axis of said bearings and transversely to the line of propagation of said weight wheels.

4. A land packer comprising, a frame having a pair of spaced bearings in horizontal alignment and defining a clear space below, between and for some distance above the bearings, a pair of discs rotatably journaled in confronting relation respectively in the bearings, a plurality of flexible elongated members tensioned between said pair of discs and secured respectively radially outward from the axis thereof, and a plurality of centerless weight wheels mounted about and secured to the flexible elongated members at spaced intervals therealong, said plurality of flexible elongated members rotating with said centerless weight wheels in a substantially fixed parallel relation about the axis of said spaced bearings and transversely to the line of propagation of said centerless weight wheels.

5. A land packer comprising, a frame having a pair of spaced bearings in horizontal alignment and defining a clear space below, between and for some distance above, the bearings, a pair of discs rotatably journaled in confronting relation respectively in the bearings, a plurality of flexible elongated members tensioned between said pair of discs and secured respectively radially outward from the axis thereof, means divergently biasing the confronting discs, and a plurality of centerless weight wheels mounted upon and secured to the flexible elongated members at spaced intervals therealong.

6. A land packer comprising, a frame having a pair of spaced bearings in horizontal alignment and defining a clear space below, between and for some distance above, the bearings, a short shaft rotatably received in each of said bearings and restrained against inward axial displacement, a pair of discs axially secured to said shafts in confronting relation, each of said discs being spaced from its associated bearing, a plurality of flexible elongated members tensioned between said pair of discs and secured respectively radially outward from the axis thereof, spring means secured to each of said shafts and bearing against the associated disc whereby to bias the discs divergently and thereby render said elongated members resiliently tensioned, and a plurality of centerless weight wheels mounted about and secured to the flexible elongated members at spaced intervals therealong.

7. A land packer comprising, a frame having a pair of horizontally spaced and axially aligned bearings, a pair of confronting rotors journaled respectively in said bearings, a plurality of chains secured endwise across the respective rotors and lying in mutually spaced parallel relation with the axis of said rotors, and a plurality of centerless weight wheels mounted around said chains in horizontally spaced relation, said centerless wheels having inwardly directed lugs interfitting with the linkage construction of said chains to permit shifting of each of the weight wheels in its own plane of travel during forward motion of the packer.

References Cited in the file of this patent

UNITED STATES PATENTS

| 709,729 | Yoost | Sept. 23, 1902 |
| 954,653 | Smith | Apr. 12, 1910 |
| 1,190,257 | Henderson | July 4, 1916 |
| 2,513,165 | Gilreath | June 27, 1950 |
| 2,635,403 | Gandrud | Apr. 21, 1953 |